United States Patent
Hansen et al.

(10) Patent No.: US 10,591,579 B2
(45) Date of Patent: Mar. 17, 2020

(54) PASSAGE DETERMINATION OF A PORTABLE WIRELESS TRANSCEIVER DEVICE

(71) Applicant: ABB Schweiz AG, Baden (CH)

(72) Inventors: Ewa Hansen, Vasteras (SE); Jonas Neander, Vasteras (SE); Krister Landernas, Hallstahammar (SE); Linus Thrybom, Vasteras (SE)

(73) Assignee: ABB Schweiz AG, Baden (CH)

( * ) Notice: Subject to any disclaimer, the term of this patent is extended or adjusted under 35 U.S.C. 154(b) by 124 days.

(21) Appl. No.: 15/467,752

(22) Filed: Mar. 23, 2017

(65) Prior Publication Data

US 2017/0192084 A1 Jul. 6, 2017

Related U.S. Application Data

(63) Continuation of application No. PCT/EP2014/070198, filed on Sep. 23, 2014.

(51) Int. Cl.
| | |
|---|---|
| *H04W 64/00* | (2009.01) |
| *G01S 5/02* | (2010.01) |
| *G01S 5/16* | (2006.01) |
| *G01S 5/06* | (2006.01) |
| *G01S 11/02* | (2010.01) |

(52) U.S. Cl.
CPC ............. *G01S 5/0284* (2013.01); *G01S 5/06* (2013.01); *G01S 5/16* (2013.01); *G01S 11/026* (2013.01)

(58) Field of Classification Search
None
See application file for complete search history.

(56) References Cited

U.S. PATENT DOCUMENTS

| | | | |
|---|---|---|---|
| 2013/0130710 A1* | 5/2013 | Boyer | H04W 64/00 455/456.1 |
| 2013/0337789 A1* | 12/2013 | Johnson | H04W 4/02 455/414.1 |
| 2014/0185520 A1 | 7/2014 | Gao et al. | |

FOREIGN PATENT DOCUMENTS

| | | |
|---|---|---|
| CN | 102170294 A | 8/2011 |
| EP | 2663142 A1 | 11/2013 |
| GB | 2478010 A | 8/2011 |

OTHER PUBLICATIONS

European Patent Office, International Search Report and Written Opinion, PCT/EP14/70198, dated Jun. 16, 2015, 9 pages.

(Continued)

*Primary Examiner* — Suhail Khan
(74) *Attorney, Agent, or Firm* — J. Bruce Schelkopf; Taft Stettinius Hollister LLP

(57) ABSTRACT

There is provided a method for determining passage of a portable wireless transceiver device along a constrained path. The method comprises acquiring at least one time of flight (ToF) measurement and auxiliary information, the at least one ToF measurement being measured between a portable wireless transceiver device and a single network node. The network node is mounted proximate a constrained path. The method comprises determining whether the portable wireless transceiver device has passed the network node along the constrained path or not based on the at least one ToF measurement and the auxiliary information.

17 Claims, 3 Drawing Sheets

(56) References Cited

OTHER PUBLICATIONS

The Patent Office of the People's Republic of China, First Office Action in corresponding application No. 201480083564.4, dated Nov. 5, 2019, 13 pp.
The Patent Office of the People's Republic of China, Search Report in corresponding application No. 201480083564.4, dated Oct. 28, 2019, 2 pp.

* cited by examiner

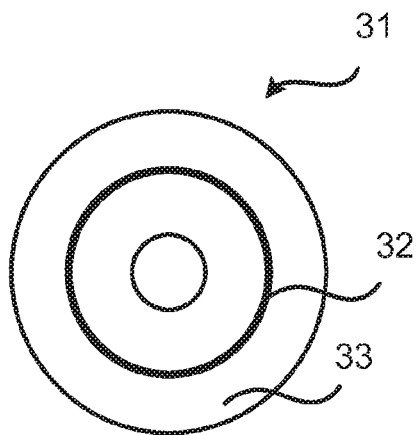
Fig. 6
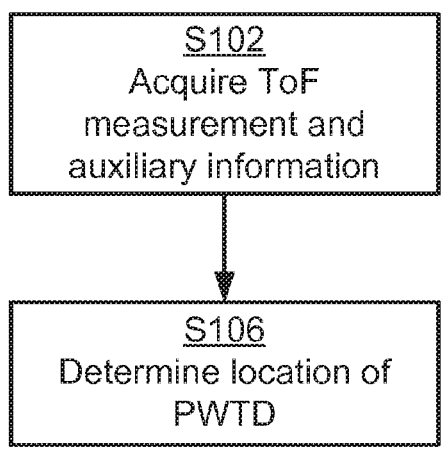
Fig. 7
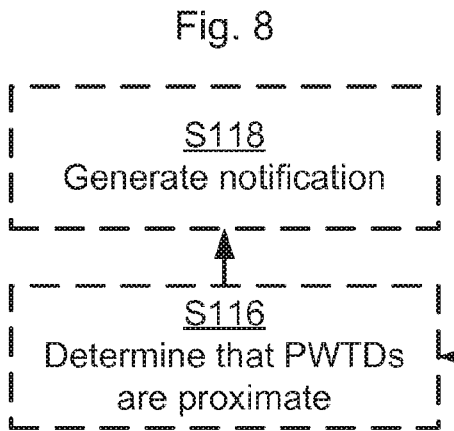
Fig. 8
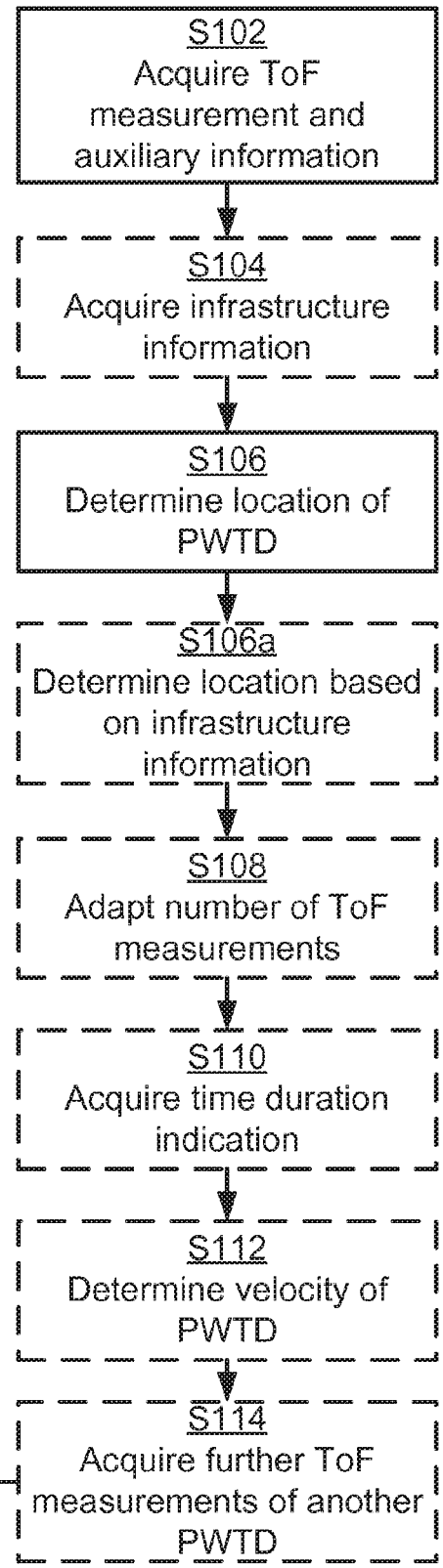

PASSAGE DETERMINATION OF A PORTABLE WIRELESS TRANSCEIVER DEVICE

TECHNICAL FIELD

Embodiments presented herein relate to determining passage of a portable wireless transceiver device, and particularly to methods, a server, a system, a computer program, and a computer program product for determining passage of a portable wireless transceiver device along a constrained path.

BACKGROUND

In communications networks, there may be a challenge to obtain good performance and capacity for a given communications protocol, its parameters and the physical environment in which the communications network is deployed.

More particularly, indoor positioning and localization for industrial may be more common as industrial processes continue to get more automated.

The technology evolution has recently provided inertial measurement unit (IMU) sensors and radio technologies suitable for localization at a decreasing cost/performance ratio.

One promising method is to use measurements of radio frequency based parameters and to use measurements from at least three devices, such as radio access network nodes or access points, to triangulate the position of a portable wireless transceiver device.

Since an industrial plant may consist of both production areas and storage/transport areas, it is likely that the production areas will benefit and motivate the cost for highly accurate triangulation coverage, while e.g. the transport tunnels only may need a less accurate localization system. In certain scenarios it may thus be likely that high accuracy will be needed in some geographical areas, whereas some geographical areas may cope with less accuracy.

One example of lower accuracy would be longer transport corridors and tunnels where an accuracy of some meters may provide sufficient accuracy of the position of the portable wireless transceiver device.

One low accuracy localization mechanisms could be to use dead reckoning with input from sensors, e.g. an inertial measurement unit (IMU), which detects e.g. heading and acceleration. However, when using IMUs, it is necessary to synchronize the calculated position regularly since there is a drift in all types of sensors today.

High localization accuracy requires triangulation with at least three fixed network nodes and may provide sub meter accuracy.

Hence, there is still a need for improved passage determination of portable wireless transceiver devices.

SUMMARY

An object of embodiments herein is to provide efficient passage determination of portable wireless transceiver devices.

According to a first aspect there is presented a method for determining passage of a portable wireless transceiver device along a constrained path. The method comprises acquiring at least one time of flight (ToF) measurement and auxiliary information, the at least one ToF measurement being measured between a portable wireless transceiver device and a single network node. The network node is mounted proximate a constrained path. The method comprises determining whether the portable wireless transceiver device has passed the network node along the constrained path or not based on the at least one ToF measurement and the auxiliary information.

Advantageously this enables efficient passage determination of portable wireless transceiver devices.

Advantageously this enables one radio communications network infrastructure, e.g. a wireless local area network (WLAN), for providing data communication, Voice over IP and proximity localization. Advantageously this may improve the accuracy of WLAN as a proximity mechanism.

Advantageously this can be used to clear sensor drift errors, such as IMU drift errors, in case of dead reckoning applications.

Advantageously ToF measurements may be used to determine the velocity of the portable wireless transceiver device, which can be used to further improve accuracy in case of dead reckoning.

According to a second aspect there is presented a server for determining passage of a portable wireless transceiver device along a constrained path. The server comprises a processing unit. The processing unit is configured to acquire at least one time of flight (ToF) measurement and auxiliary information, the at least one ToF measurement being measured between a portable wireless transceiver device and a single network node. The network node is mounted proximate a constrained path. The processing unit is configured to determine whether the portable wireless transceiver device has passed the network node along the constrained path or not based on the at least one ToF measurement and the auxiliary information.

According to a third aspect there is presented a computer program for determining passage of a portable wireless transceiver device along a constrained path, the computer program comprising computer program code which, when run on a processing unit of a server, causes the processing unit to perform a method according to the first aspect.

According to a fourth aspect there is presented a computer program product comprising a computer program according to the third aspect and a computer readable means on which the computer program is stored.

According to a fifth aspect there is presented a system for determining passage of a portable wireless transceiver device along a constrained path.

The system comprises a server according to the second aspect, at least one network node, and at least one portable wireless transceiver device. It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 6 shows one example of a computer program product comprising computer readable means according to an embodiment; and FIGS. 7 and 8 are flowcharts of methods according to embodiments.

DETAILED DESCRIPTION

Figure 1:
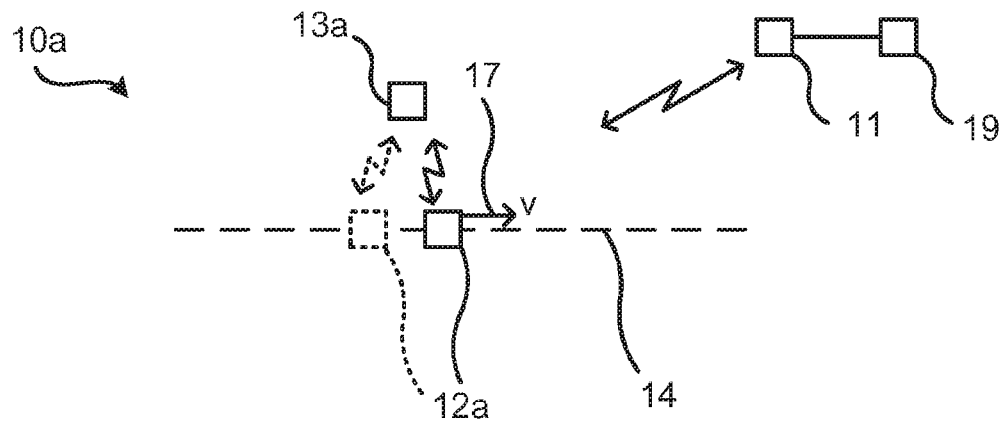
FIGS. 1 and 2 are schematic diagrams illustrating systems according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to determining passage of a portable wireless transceiver device 12a along a constrained path 14. In order to obtain such determining of passage there is provided a server 11, methods performed by the server 11, a computer program comprising code, for example in the form of a computer program product, that when run on a processing unit of the server 11, causes the processing unit to perform the methods, and a system 10a, 10b comprising such a server 11, at least one network node 13a, 13b, and at least one portable wireless transceiver device 12a, 12b.

FIG. 1 is a schematic diagram illustrating a system 10a where embodiments presented herein can be applied.

The system 10a comprises at least one network node 13a, 13b. As the skilled person understands, the system 10a may comprise a plurality of such network nodes 13a, 13b. Each one of the at least one network nodes 13a, 13b is mounted proximate a path 14. In this respect, proximate the path may imply that the network node 13a, 13b is mounted directly above the path, or directly below the path, or directly besides the path. For example, if the path has a ceiling, the network node 13a, 13b may be mounted in the ceiling. For example, if the path has a roadway, the network node 13a, 13b may be mounted in the roadway. For example, if the path has walls, the network node 13a, 13b may be mounted in one of the walls. Since the path 14 is assumed to be known, the path 14 will hereinafter be denoted a constrained path 14. As the skilled person understands, the system 10a may comprise a plurality of such constrained paths 14, as in the system 10b of FIG. 2 (see below).

The system 10a further comprises a server 11. As the skilled person understands, the system 10a may comprise a plurality of such servers 11. The server 11 may be operatively connected to at least one portable wireless device 12a, 12b. The connection between the server 11 and each one of the at least one portable wireless devices 12a, 12b may at least partly utilize a wireless radio communications network. Examples of such wireless radio communications networks and how they may operatively connect at least one portable wireless device 12a, 12b to a server 11 is well known in the art and further description thereof is therefore omitted. The server 11 may, additionally or alternatively, be operatively connected to the at least one network node 13a, 13b. The connection between the server 11 and each one of the at least one network nodes 13a, 13b may be wired and/or wireless. How to operatively connect at least one network node 13a, 13b to a server 11 is well known in the art and further description thereof is therefore omitted. The server 11 may be operatively connected to an optional end-user terminal 19.

Figure 2:
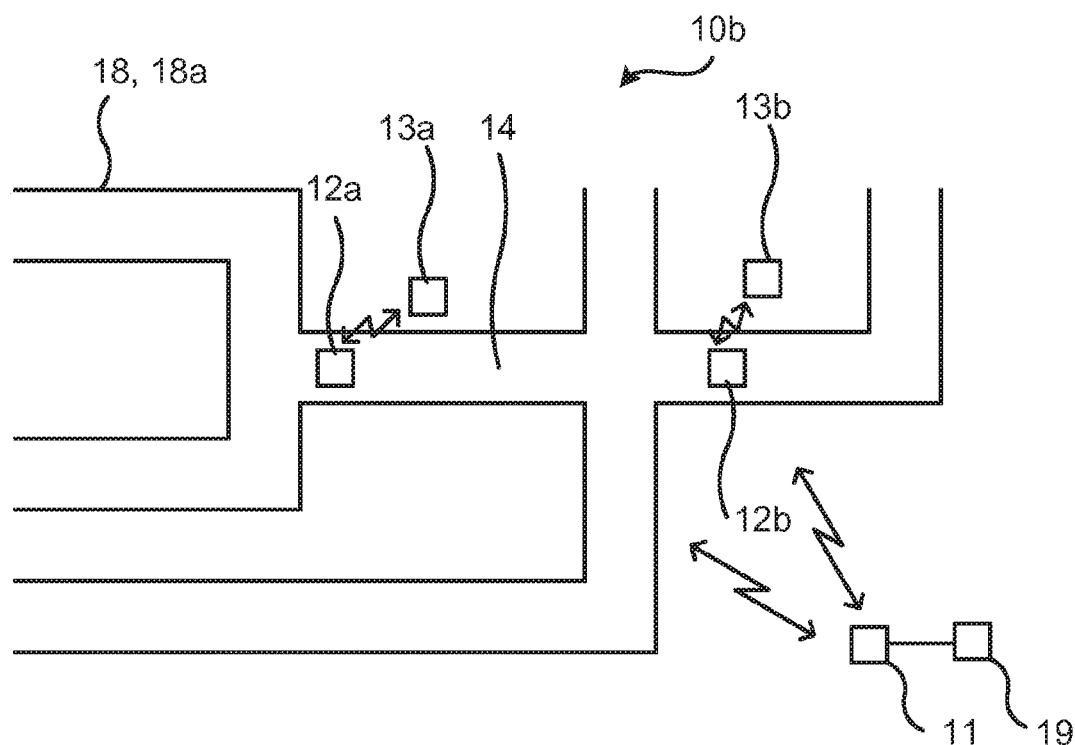

FIG. 2 is a schematic diagram illustrating a system 10b similar to the system 10a of FIG. 1 where embodiments presented herein can be applied. The system 10b of FIG. 2 comprises two network nodes 13a, 13b with functionality as disclosed with reference to FIG. 1. Two portable wireless transceiver devices 12a, 12b are operatively connected to a respective one of the two network nodes 13a, 13b. The two portable wireless transceiver devices 12a, 12b are moving along a path 14. The path 14 is provided along a road which may represent infrastructure information 18 in the form of a road map 18a. The system 10b of FIG. 2 further comprises a server 11 with functionality as disclosed with reference to FIG. 1. The server 11 may be operatively connected to an optional end-user terminal 19.

The herein disclosed embodiments overcome the drawbacks of obtaining high accuracy indoor positioning and localization information as mentioned above by using Time of Flight (ToF) measurements between a single network node 13a and a portable wireless device 12a, 12b. By measuring and monitoring the ToF between a fixed mounted network node 13a and a portable wireless device 12a, possibly using auxiliary information such as further ToF measurements and/or distance information, a local ToF-minimum can be identified. This local minimum is a good approximation of that the portable wireless device is passing the network node 13a along the constrained path 14. A detailed description of methods for determining passage of a portable wireless transceiver device 12a along a constrained path 14 will now be presented.

FIGS. 7 and 8 are flow chart illustrating embodiments of methods for determining passage of a portable wireless transceiver device 12a along a constrained path 14. The methods are performed by the server 11. The methods are advantageously provided as computer programs 32.

Reference is now made to FIG. 7 illustrating a method for determining passage of a portable wireless transceiver device 12a according to an embodiment. Parallel references are continued to FIGS. 1 and 2.

The passage of the portable wireless transceiver device 12a relative the network node 13a is based on at least one time of flight (ToF) measurement between the portable wireless transceiver device 12a and a single network node 13a. The server 11 is therefore configured to, in a step S102, acquire at least one ToF measurement 15 and auxiliary information. The at least one ToF measurement is measured between a portable wireless transceiver device 12a and a single network node 13a. The network node 13a is mounted proximate a constrained path 14. The auxiliary information is associated with a relation, or measurement, between the portable wireless transceiver device 12a and the single network node 13a. Examples of the auxiliary information will be provided below.

The server 11 is configured to, in a step S106, determine whether the portable wireless transceiver device 12a has passed the network node 11a along the constrained path 14 or not. The determination is based on the at least one ToF measurement and the auxiliary information.

ToF may be determined from time of arrival (ToA) information. ToF may be defined as the travel time of a signal from a single transmitter to a remote single receiver. The transmitter may be mounted in the network node 13a and the receiver in the portable wireless transceiver device 12a, or vice versa.

In more detail, ToF may encompass a variety of methods that measure the time that it takes for an object, particle or acoustic, electromagnetic or other wave to travel a distance through a medium. This measurement can be used for a time standard (such as an atomic fountain), as a way to measure velocity or path length through a given medium. ToF may use the absolute time of arrival at a certain receiver rather than the measured time difference between departing from the transmitter and arriving at the receiver. Using the absolute time may require the transmitter and the receiver to be time synchronized. The distance can be directly calculated from the ToF as the signals are assumed to travel with a known velocity.

Embodiments relating to further details of determining location of a portable wireless transceiver device 12a along a constrained path 14 will now be disclosed.

There may be different examples of the auxiliary information and how the auxiliary information may be used to, together with the at least one ToF measurement, determine whether the portable wireless transceiver device 12a has passed the network node 13a along the constrained path 14 or not, as in step S106.

Figure 3:
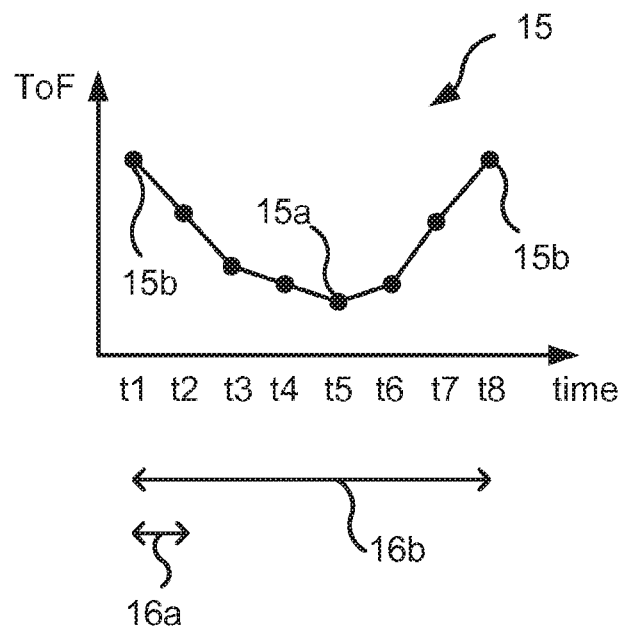
FIG. 3 schematically illustrates time of flight measurements as a function of time.

For example, the passage of the portable wireless transceiver device 12a may be based on at least three ToF measurements between the portable wireless transceiver device 12a and the single network node 13a. As illustrated in FIG. 3 a series of such ToF measurements may be performed, for example, to verify that a true local minimum has been found. FIG. 3 schematically illustrates ToF measurements as a function of time. In the illustrative example of FIG. 3 a ToF minimum for the first network node 13a is obtained at time t5 (e.g., corresponding to a situation where the portable wireless device 12a is located directly below/above/beside the first network node 13a). The auxiliary information may thus represent further ToF measurements being measured between the portable wireless transceiver device and the single network node, such that at least three ToF measurements are acquired. The step S106 of determining whether the portable wireless transceiver device 12a has passed the network node 13a along the constrained path 14 or not may then be based on a local minimum 15a of the ToF measurements not corresponding to an end-point ToF measurement 15b.

For example, the passage of the portable wireless transceiver device 12a may be based on distance information. Particularly, the auxiliary information may represent a first distance. In such a case the at least one ToF measurement may be translated into a second distance. The step S106 of determining whether the portable wireless transceiver device 12a has passed the network node 13a along the constrained path 14 or not may then be based on comparing the second distance to the first distance. For example, let the first distance be denoted $\Delta 1$ and the second distance $\Delta 1$. It may then be determined that the portable wireless transceiver device 12a has passed the network node 13a if $|\Delta 1 - \Delta 2| < \varepsilon$, where $\varepsilon$ is a threshold distance. The threshold distance $\varepsilon$ may, for example, depend on $\Delta 1$. For example, $\varepsilon$ may be one order of magnitude smaller than $\Delta 1$. In turn, $\Delta 1$ may correspond to the minimum distance between the portable wireless transceiver device 12a and the network node 13a as measured when the portable wireless transceiver device 12a passes the network node 13a along the constrained path 14.

There may be different ways to perform the at least two ToF measurements. Different embodiments relating thereto will now be described in turn.

According to a first embodiment any ToF measurements are based on radio signalling between the portable wireless transceiver device and the network node. Hence, the portable wireless transceiver device 12a may be a portable wireless radio transceiver device, and the network node 13a is a radio access network (RAN) node. The RAN node may be a wireless local area network (WLAN) access point.

According to a second embodiment any ToF measurements are based on light signalling between the portable wireless transceiver device and the network node. The light signalling may involve transmitting and receiving laser beams between the portable wireless transceiver device 12a and the network node 13a.

Reference is now made to FIG. 8 illustrating methods for determining passage of a portable wireless transceiver device according to further embodiments. Parallel references are continued to FIGS. 1 and 2.

There may be different ways to determine how many, how often, and/or when to acquire ToF measurements. Different embodiments relating thereto will now be described in turn.

For example, the number of ToF measurements may be adapted based on the estimated distance of the portable wireless transceiver device 12a to network node 13a. The server 11 may therefore be configured to, in an optional step S108, adapt the number of ToF measurements to be acquired depending on the (thus far) determined passage of the portable wireless transceiver device 12s relative the network node 13a. This may allow for more ToF measurements to be performed and acquired by the server 11 when the portable wireless transceiver device 12a is closer to the network node 13a. There may be different ways for the server 11 to adapt the number of ToF measurements. According to one embodiment the server 11 is configured to adapt how often the ToF measurements are performed. According to another embodiment the server 11 is configured to adapt how often it acquires the ToF measurements.

The acquired ToF measurements may be utilized to determine a velocity of the portable wireless transceiver device 12a. Also the distance between the portable wireless transceiver device 12a and the network node 13a may be utilized to determine the velocity. This distance may be determined from the minimum of the ToF measurements. Particularly, the server 11 may be configured to, in an optional step S110, acquire a time duration indication 16a, 16b for measuring at least two ToF measurements between the portable wireless transceiver device 12a and the single network node 13a; and, in an optional step S112, determine the velocity 17 of the portable wireless transceiver device 12a based on the acquired time duration indication, see FIG. 3. The time duration indication 16a may correspond to the time interval between two ToF measurements. Alternatively the time duration indication 16b may correspond to the time interval for performing a series of ToF measurements.

There may be different examples of the constrained path 14. For example, the constrained path 14 may be an indoor passageway 14a. The indoor passageway 14a may represent a tunnel.

Further, the constrained path 14 may be part of infrastructure information 18. Hence, the server 11 may be configured to, in an optional step S104, acquire infrastructure information 18 comprising the constrained path 14. The passage of the portable wireless transceiver device 12a may also be based on the acquired infrastructure information. Hence, the server 11 may be configured to, in an optional step S106a, determine whether the portable wireless transceiver device 12a has passed the network node 13a along the constrained path 14 or not also based on the infrastructure information 18.

There may be different examples of infrastructure information 18. For example, the infrastructure information 18 may be a roadmap 18a. The roadmap 18 may be a roadmap of a mining site. Hence the tunnel may be a transport tunnel in a mining site.

The portable wireless transceiver device 12a may be vehicle mounted. The vehicle may be a vehicle for land transportation. Hence the portable wireless transceiver device 12a may be mounted on a vehicle that travels in a transport tunnel in a mining site. The vehicle may be an unmanned vehicle. However, the portable wireless transceiver device 12a may alternatively be mounted to other devices, units, etc. For example, the portable wireless transceiver device 12a may be mounted to a piece of clothing, a tool, etc.

ToF measurements from also a least one further portable wireless transceiver device 12b may be acquired. Hence, the server 11 may be configured to, in an optional step S114, acquire further ToF measurements between a further portable wireless transceiver device 12b and the network node 13a or a further single network node 13b.

ToF measurements from two portable wireless transceiver devices 12a, 12b may be utilized in order to determine whether or not the two portable wireless transceiver device 12a, 12b are approaching each other along the constrained path 14. Particularly, the server 11 may be configured to, in an optional step S116, determine that the portable wireless transceiver device 12a and the further portable wireless transceiver device 12b are proximate each other. In order to do so the server 11 may, for example, compare the ToF measurements from the network node 13a or the further single network node 13b for the two portable wireless transceiver devices 12a, 12b. In this respect the actual distance between the portable wireless transceiver device 12a and the further portable wireless transceiver device 12b may depend on the distance between the network node 13a to the further single network node 13b, how often ToF measurements are acquired, and/or how many ToF measurements that are acquired.

That the portable wireless transceiver device 12a and the further portable wireless transceiver device 12b are proximate each other may indicate that they are moving towards each other. The server 11 may therefore be configured to, in an optional step S118, generate a notification that the portable wireless transceiver device 12a and the further portable wireless transceiver device 12b are proximate each other. The notification may be sent to the end-user terminal 19. In order to further determine whether the portable wireless transceiver device 12a and the further portable wireless transceiver device 12b are moving towards each other also ToF measurements from further network nodes and/or further measurements from the single network nodes 13a, 13b may be used. Such ToF measurements may be used to determine movement directions of the portable wireless transceiver device 12a and the further portable wireless transceiver device 12b.

Figure 4:
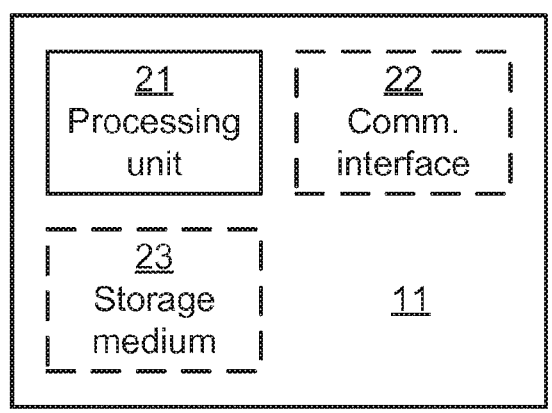
FIG. 4 is a schematic diagram showing functional units of a server according to an embodiment.

FIG. 4 schematically illustrates, in terms of a number of functional units, the components of a server 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 6), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The server 11 may further comprise a communications interface 22 for communications with at least one portable wireless transceiver device 12a, 12b, and/or at least one network node 13a 13b, and optionally with an end-user terminal 19. As such the communications interface 22 may comprise one or more transmitters and receivers, comprising analogue and digital components. The processing unit 21 controls the general operation of the server 11 e.g. by sending data and control signals to the communications interface 22 and the storage medium 23, by receiving data and reports from the communications interface 22, and by retrieving data and instructions from the storage medium 23. Other components, as well as the related functionality, of the server 11 are omitted in order not to obscure the concepts presented herein.

Figure 5:
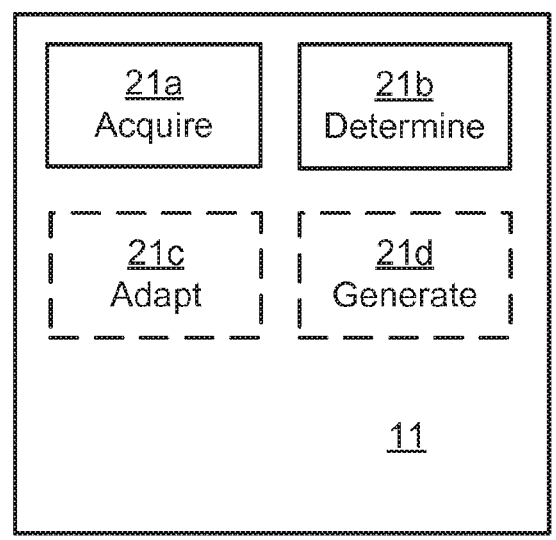
FIG. 5 is a schematic diagram showing functional modules of a server according to an embodiment.

FIG. 5 schematically illustrates, in terms of a number of functional modules, the components of a server 11 according to an embodiment. The server 11 of FIG. 5 comprises a number of functional modules; an acquire module 21a configured to perform steps S102, S104, S110, and/or S114, and a determine module 21b configured to perform steps S106, S106a, S112, and/or S116a. The server 11 of FIG. 5 may further comprises a number of optional functional modules, such as any of an adapt module 21c configured to perform step S108, and a generating module 21d configured to perform step S118. The functionality of each functional module 21a-d has been disclosed above in the context of which the functional modules 21a-d may be used. In general terms, each functional module 21a-d may be implemented in hardware or in software. Preferably, one or more or all functional modules 21a-d may be implemented by the processing unit 21, possibly in cooperation with functional units 22 and/or 23. The processing unit 21 may thus be arranged to from the storage medium 23 fetch instructions as provided by a functional module 21a-d and to execute these instructions, thereby performing any steps as will be disclosed hereinafter.

FIG. 6 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 6, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining passage of a portable wireless transceiver device along a constrained path, comprising:
   acquiring at least three time of flight, ToF, measurements being measured between a portable wireless transceiver device and a single network node, wherein the network node is mounted proximate a constrained path; and
   determining whether the portable wireless transceiver device has passed the network node along the constrained path or not based on a local minimum measurement of the at least three ToF measurements not corresponding to an endpoint ToF measurement.

2. The method according to claim 1, comprising:
   acquiring auxiliary information,
   wherein said auxiliary information represents a first distance, and wherein at least one ToF measurement is translated into a second distance, and
   wherein determining whether the portable wireless transceiver device has passed the network node along the constrained path or not is based on comparing said second distance to said first distance.

3. The method according to claim 1, further comprising:
   adapting the number of ToF measurements to be acquired depending on the determined passage of the portable wireless transceiver device relative the network node.

4. The method according to claim 1, further comprising: acquiring a time duration indication for measuring at least two of the ToF measurements between the portable wireless transceiver device and the single network node; and
   determining a velocity of the portable wireless transceiver device based on the acquired time duration indication.

5. The method according to claim 1, wherein the constrained path is an indoor passageway.

6. The method according to claim 1, further comprising:
   acquiring infrastructure information comprising the constrained path, and
   determining whether the portable wireless transceiver device has passed the network node along the constrained path or not also based on the infrastructure information.

7. The method according to claim 6, wherein the infrastructure information is a roadmap.

8. The method according to claim 1, wherein the portable wireless transceiver device is vehicle mounted.

9. The method according to claim 1, further comprising:
   acquiring further ToF measurements between a further portable wireless transceiver device and the network node or a further single network node.

10. The method according to claim 9, further comprising:
    determining that the portable wireless transceiver device and the further portable wireless transceiver device are proximate each other; and
    generating a notification thereof.

11. The method according to claim 1, wherein the at least one ToF measurement is based on radio signaling between the portable wireless transceiver device and the network node.

12. The method according to claim 1, wherein the portable wireless transceiver device is a portable wireless radio transceiver device, and wherein the network node is a radio access network node.

13. The method according to claim 12, wherein the radio access network node is a wireless local area network, WLAN, access point.

14. The method according to claim 1, wherein the at least one ToF measurement is based on light signaling between the portable wireless transceiver device and the network node.

15. A server for determining passage of a portable wireless transceiver device along a constrained path, the server comprising:
    a memory device structured to store a plurality of instructions;
    a processing unit structured to execute the plurality of instructions effective to:
        acquire at least three time of flight, ToF, measurements being measured between a portable wireless transceiver device and a single network node, wherein the network node is mounted proximate a constrained path; and
        determine whether the portable wireless transceiver device has passed the network node along the constrained path or not based on a local minimum measurement of the at least three ToF measurements not corresponding to an endpoint ToF measurement.

16. A system for determining passage of a portable wireless transceiver device along a constrained path, the system comprising a server according to claim 15, at least one network node, and at least one portable wireless transceiver device.

17. A memory device for determining passage of a portable wireless transceiver device along a constrained path comprising:
    a set of instructions stored on the memory device and structured to be executable by a processing device effective to:
        acquire at least three time of flight, ToF, measurements being measured between a portable wireless transceiver device and a single network node, wherein the network node is mounted proximate a constrained path; and
        determine whether the portable wireless transceiver device has passed the network node along the constrained path or not based on a local minimum measurement of the at least three ToF measurements not corresponding to an endpoint ToF measurement.

* * * * *